US012584526B2

(12) United States Patent
Reichert et al.

(10) Patent No.: US 12,584,526 B2
(45) Date of Patent: Mar. 24, 2026

(54) COUPLING DEVICE AND DRIVE TRAIN FOR A MOTOR VEHICLE

(71) Applicant: Schaeffler Technologies AG & Co. KG, Herzogenaurach (DE)

(72) Inventors: Stefan Reichert, Malsch (DE); Johannes Arnold, Baden-Württemberg-Kappelrodeck (DE); David Bauert, Neuried (DE); Markus Eisele, Hügelsheim (DE); Elmar Lorenz, Rheinmünster Söllingen (DE); Peter Greb, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/727,122

(22) PCT Filed: Dec. 15, 2022

(86) PCT No.: PCT/DE2022/100956
§ 371 (c)(1),
(2) Date: Jul. 8, 2024

(87) PCT Pub. No.: WO2023/138719
PCT Pub. Date: Jul. 27, 2023

(65) Prior Publication Data
US 2025/0083515 A1 Mar. 13, 2025

(30) Foreign Application Priority Data
Jan. 18, 2022 (DE) ..................... 10 2022 101 047.3

(51) Int. Cl.
*F16D 11/10* (2006.01)
*B60K 17/02* (2006.01)
(Continued)

(52) U.S. Cl.
CPC .............. *F16D 11/10* (2013.01); *B60K 17/02* (2013.01); *F16D 23/12* (2013.01);
(Continued)

(58) Field of Classification Search
CPC .............. F16D 11/00; F16D 2011/002; F16D 2011/006; F16D 11/10; F16D 11/14;
(Continued)

(56) References Cited

U.S. PATENT DOCUMENTS

| | | | | |
|---|---|---|---|---|
| 4,280,583 A | * | 7/1981 | Stieg ........................ | F16D 11/14 180/250 |
| 4,770,280 A | * | 9/1988 | Frost ........................ | F16D 23/12 74/473.1 |
| 4,977,989 A | * | 12/1990 | Ashikawa .............. | B60K 17/35 192/114 R |

FOREIGN PATENT DOCUMENTS

| | | |
|---|---|---|
| DE | 921670 C | 12/1954 |
| DE | 102019115938 A1 | 12/2020 |

* cited by examiner

*Primary Examiner* — Richard M Lorence

(57) ABSTRACT

A coupling device for coupling and decoupling a drive element with an output element of a drive train for a motor vehicle includes a coupling element, linearly displaceable from a coupling position to a decoupling position, a first latching device for fixing the coupling element in a one of the coupling position or the decoupling position, a first spring element for urging the coupling element into the other one of the coupling position or the decoupling position, and a first actuator arranged to cancel the fixing of the first latching device and to further load the first spring element to displace the coupling element into the other one of the coupling position or the decoupling position. In the coupling position, the coupling element couples the drive element with the output element, and, in the decoupling position, the drive element is decoupled from the output element.

17 Claims, 4 Drawing Sheets

(51) Int. Cl.
| | |
|---|---|
| *F16D 11/00* | (2006.01) |
| *F16D 23/12* | (2006.01) |
| *F16D 25/08* | (2006.01) |
| *F16D 28/00* | (2006.01) |

(52) U.S. Cl.
CPC .. *F16D 2011/002* (2013.01); *F16D 2011/006* (2013.01); *F16D 25/08* (2013.01); *F16D 28/00* (2013.01)

(58) Field of Classification Search
CPC ........ F16D 23/12; F16D 25/08; F16D 25/088; F16D 28/00; B60K 17/02
See application file for complete search history.

COUPLING DEVICE AND DRIVE TRAIN FOR A MOTOR VEHICLE

CROSS-REFERENCE TO RELATED APPLICATIONS

This application is the United States National Phase of PCT Appln. No. PCT/DE2022/100956 filed Dec. 15, 2022, which claims priority to German Application No. DE102022101047.3 filed Jan. 18, 2022, the entire disclosures of which are incorporated by reference herein.

TECHNICAL FIELD

The present disclosure relates to a coupling device for coupling and decoupling a drive element with an output element of a drive train for a motor vehicle, including a coupling element which can be transferred from a coupling position, in which it couples the drive element with the output element, into a decoupling position, in which the drive element is decoupled from the output element, and vice versa.

BACKGROUND

The drive train is understood to mean the components of the motor vehicle through which torque is transmitted from an engine to the wheels or vice versa. The drive train typically includes components such as transmissions, shafts, differentials, etc., the corresponding details of which are well known to a person skilled in the art.

Particularly in an all-wheel drive motor vehicle, in which a drive torque generated by the engine is selectively distributed among the wheels, it is advantageous in certain driving situations to shut down certain components of the drive train, i.e., to decouple them from the other components, such that transmission of a rotary movement or a torque to the shut-down components is avoided. This ensures that energy losses are avoided due to a lack of rotary movement of the shut-down components.

The coupling device is provided for the corresponding coupling and decoupling, and is connected or connectable on the one hand to the drive element and on the other hand to the output element. Such a coupling device is often also referred to as a disconnect unit. The drive element is understood to be the component which is connected or connectable to the coupling device and which is arranged on the engine side thereof. The output element is understood to be the component which is connected or connectable to the coupling device and which is arranged on the wheel side thereof. A transmission of torque between these elements occurs when the coupling device is in a coupling state or when the coupling element is in the coupling position.

With regard to the coupling or decoupling process, there is a need for this to take place with little delay and thus for the switching time to be short. The present disclosure provides an improved concept in this regard in connection with a coupling device.

SUMMARY

According to the present disclosure a coupling device of the above-mentioned type including at least one actuator, at least one latching device and at least one spring element is provided. The linearly displaceable coupling element is fixed in the coupling or decoupling position as the starting position by means of the latching device while the spring element is simultaneously under load and loads the coupling element into the respective other position. The spring element can be further loaded by means of the actuator for transfer into the respective other position and the fixing by the latching device can be canceled such that the coupling element can be displaced into the other position by means of the spring element after release by the actuator.

The coupling element is displaceable one-dimensionally along a movement route, with the coupling element being displaced from the coupling position into the decoupling position and vice versa along the movement route. The coupling element is in the coupling position when it is at one end and in the decoupling position when it is at the other end of the movement route. When the coupling element is in the starting position, i.e., in the coupling position or the decoupling position, it is held in position by means of the latching device. In addition, the spring element is loaded in such a way that its elastic restoring force pre-loads or forces the coupling element into the respective other position against the fixing action of the latching device.

If the coupling element is to be transferred into the respective other position, the spring element is first loaded further by means of the actuator. Accordingly, the coupling element is initially moved along the movement route away from the position into which it is to be transferred. The coupling element can be moved in the process to the extreme end of the movement path, to be precise while the spring element is being further loaded or further compressed. In addition, the fixing of the coupling element brought about by the latching device is canceled such that movement of the coupling element along the movement route is enabled. Once the movement of the coupling element and thus the further loading of the spring element is complete, the coupling element is released by or via the actuator such that the coupling element is displaced into the respective other position solely by means of the elastic loading force of the spring element.

The actuator can, for example, be an electromechanical component such as an electric motor or pneumatic actuating element. The movement generated by the actuator can be transmitted to the coupling element or a component connected to the coupling element, and release of the coupling element by the actuator after further loading of the spring element occurs, for example, by transmission of the movement generated by the actuator to the coupling element via a shaft or disk with a cam.

The present disclosure provides that transfer from the coupling position into the decoupling position or vice versa is not carried out entirely by means of the actuator, but rather that this is only used for further loading of the spring element. Instead, the actual transfer process of the coupling element takes place by means of the energy stored in the spring element. Since relaxation of the spring element occurs, as it were, abruptly or instantaneously, a shorter switching time is achieved compared to the complete transfer process being carried out by means of the actuator. In order to achieve this short switching time, it is not necessary for the actuator to be correspondingly high-performance and highly dynamic.

In the case of the coupling device according to the disclosure, precisely one actuator, one spring element and one latching device can be provided, such that transfer of the coupling element either from the decoupling position into the coupling position or from the coupling position into the decoupling position takes place by means of these components. The coupling element can be transferred back via further means, for example via another actuator, by means of which the complete switching process is carried out without a corresponding spring element.

In contrast, however, one actuator, one spring element and one latching device may be provided in each case for movement from the decoupling position into the coupling position and from the coupling position into the decoupling position. In other words, two of each of these components may be provided, such that transfer of the coupling element can take place both from the decoupling position into the coupling position and from the coupling position into the decoupling position according to the concept explained above and the advantages mentioned here are obtained for transfer into both positions. When the coupling element is transferred from the coupling position into the decoupling position and vice versa, one spring element may be loaded and the other may be relaxed, and the energy stored in the relaxing spring element is transmitted to a large extent to the loading spring element. The energy released when one of the spring elements relaxes is therefore not dissipated or lost, but is largely stored in the respective other spring element.

For example, the coupling device is constructed mirror-symmetrically with respect to the movement route and the spring elements, and, for example, with respect to the actuators and the latching devices. In the coupling and decoupling positions, the coupling element can thus in each case be at the same distance from a center or symmetry point of the movement route or an axis of symmetry. The same applies to the positions of the coupling element in which the respective spring element has been further loaded starting from the starting position. The two spring elements may have the same spring stiffness. The further loading therefore serves, for example, to compensate for any energy dissipation or the corresponding energy loss that occurs, e.g., due to friction, when the coupling element is transferred into the respective other position and to ensure that the transfer process does not terminate prematurely or come to a halt due to a lack of energy in this regard.

In the case of the coupling device according to the disclosure, it is conceivable that the or each spring element is arranged between the coupling element and a component that is stationary with respect to a housing of the coupling device and is supported thereon. Each spring element is therefore clamped between the coupling element and the stationary component and/or fastened thereto at the ends. Each spring element can be supported directly on the coupling element and the stationary component. Furthermore, Each spring element can also be supported indirectly on the coupling element and the stationary component, i.e., at least one further component is located between the spring element and the coupling element or the stationary component. The stationary component may be the housing itself, such that each spring element is supported accordingly on an inner wall of the housing. Additionally or alternatively, the stationary component can be an inner housing which is arranged in the housing, is optionally fastened thereto and which encloses the spring elements, for example.

Each spring element may be or comprise a coil spring. For example, the spring element may include a plurality of coil springs which are provided next to one another and which are arranged along a radially outer portion of the disk-like or annular coupling element. It is also conceivable that the spring element is a coil spring extending along the radially outer portion of the coupling element. Each spring element may also be or include a disk spring, which may also extend along the radially outer portion of the disk-like or annular coupling element.

The coupling element may have or include a shift collar rotatably mounted by means of a bearing. The shift collar has an internal toothing which is arranged on an inner circumference and which can be brought into engagement with an external toothing arranged on an outer circumference of the drive element and at the same time with an external toothing arranged on an outer circumference of the output element in order to couple the drive element to the output element. The shift collar is an annular component with the internal toothing provided on its radial inner circumference. By displacing the shift collar in its axial direction, which coincides with the respective axial directions of the drive and output elements, an interlocking connection is created between the internal toothing of the shift collar and the external toothings of the drive element and output element. The corresponding axial displacement of the shift collar corresponds to the displacement of this coupling element along the one-dimensional movement route.

Owing to the interlocking connection between the internal toothing of the shift collar and the external toothings of the drive and output elements, which is present in the coupling state of the coupling element provided as the shift collar, the shift collar rotates together with the drive and output elements. It is therefore necessary for the shift collar to be rotatably mounted by means of the bearing with respect to the stationary components of the coupling device, e.g., with respect to the housing. An axial needle bearing can be provided as the bearing by means of which the coupling element is rotatably mounted. This can include an annular, rotationally fixed bearing surface with respect to the or a housing of the coupling device, on which bearing surface the spring element is supported, and an annular, rotatable bearing surface which is fastened to the coupling element, e.g., the shift collar, or is formed thereon, and at least one rolling body of the axial needle bearing is arranged between the rotationally fixed bearing surface and the rotatable bearing surface.

In the case of the coupling device according to the disclosure, each latching device can include a latching pawl that can be moved from a latching position into a release position. In the latching position, the latching pawl protrudes into the movement route along which the coupling element moves on transfer from the starting position into the respective other position. Alternatively, in the latching position, the latching pawl protrudes into a movement path along which a guide element moving with the coupling element moves on transfer from the starting position into the respective other position. The latching pawl releases the movement route or movement path in the release position. If the coupling element is in the coupling or decoupling position, the guide element is then pressed by means of the spring element against the latching pawl located in the latching position, with the counterforce required to fix the coupling element being applied by means of the latching pawl. As soon as the coupling element is moved away from the latching pawl by means of the actuator to further load the spring element, the latching pawl is transferred into the release position, such that the coupling element or the guide element can pass the corresponding starting position unhindered for transfer into the respective other position after the coupling element has been released by the actuator.

If the coupling element is the shift collar bearing-mounted by the axial needle bearing, then the guide element can be arranged between the rotationally fixed bearing surface of the axial needle bearing and the spring element. To implement the one-dimensional movement route of the coupling element, the guide element and the spring element can be arranged within the or an, e.g., elongate, inner housing, within which the guide element is guided in a linearly movable manner. The inner housing can be hollow-cylindrical, and the guide element can be annular. The guide element can have at least one projection which protrudes outward through a longitudinal opening in the inner housing. The projection moves along a movement path when the shift collar is displaced in the axial direction, and the latching pawl can protrude into the path of movement of the projection in the latching state and release it in the release position.

It is conceivable that each latching device has a return spring coupled to the latching pawl and a pawl actuator. The latching pawl can be transferred from the release position into the latching position or vice versa by means of the pawl actuator and against an elastic restoring force of the return spring, and the latching pawl can be transferred into the respective other position by means of the elastic restoring force. The pawl actuator can be an electromechanically or pneumatically operated actuating element. To transfer the latching pawl from the latching position into the release position, the pawl actuator can generate a force that overcomes the elastic restoring force of the return spring, such that the latching pawl is accordingly brought into the release position. As soon as this pawl actuator force is removed, the return spring automatically forces the latching pawl into the latching position.

The latching pawl can be beveled and/or protrude obliquely into the movement route or path in the latching position, such that the coupling element or the guide element can pass the latching pawl fixing the coupling element in the respective other position unhindered on transfer from the starting position into the respective other position. When passing this point, the coupling element or the guide element slides along the surface of the latching pawl that is oblique to the movement route or path and forces it out of the movement route or path against the restoring force of the return spring.

With the coupling device according to the disclosure, it is possible for a control device of the coupling device or of the motor vehicle to be connected to each actuator and each latching device, e.g., each pawl actuator. The control device is configured, when a control signal is present which indicates transfer of the coupling element from the starting position into the respective other position, to drive the respective actuator and the respective latching device in such a way that the spring element is further loaded by means of the actuator and fixing by the latching device is canceled. The control device is connected via corresponding electrical connections to the actuator and the latching device, e.g., the pawl actuator, which are each configured as electromechanical actuating means. If the actuator and/or the pawl actuator is/are configured as pneumatically operated actuating means, the control device can be connected to a correspondingly drivable valve device by means of which the actuators can be actuated.

The present disclosure further relates to a drive train for a motor vehicle, including a drive element, an output element and a coupling device according to the above description for coupling and decoupling the drive element to and from the output element. All the advantages and features explained above of the coupling device according to the disclosure are applicable to the drive train according to the disclosure and vice versa.

The drive element and the output element each are or include a shaft of the drive train. For instance, the drive element can be a drive shaft that is connected or connectable to an engine of the motor vehicle. The output element can be a wheel hub of a wheel of the motor vehicle arranged coaxially with respect to the drive shaft or a shaft directly connected to the wheel hub. The engine can be an electric machine or an internal combustion engine. It is also conceivable for the drive train to include both an electric machine and an internal combustion engine or to be connected or connectable thereto, wherein the drive train is in this case intended for a hybrid vehicle.

BRIEF DESCRIPTION OF THE DRAWINGS

The disclosure is explained below on the basis of exemplary embodiments with reference to the drawings. The drawings are schematic representations, in which.

DETAILED DESCRIPTION

Figure 1:
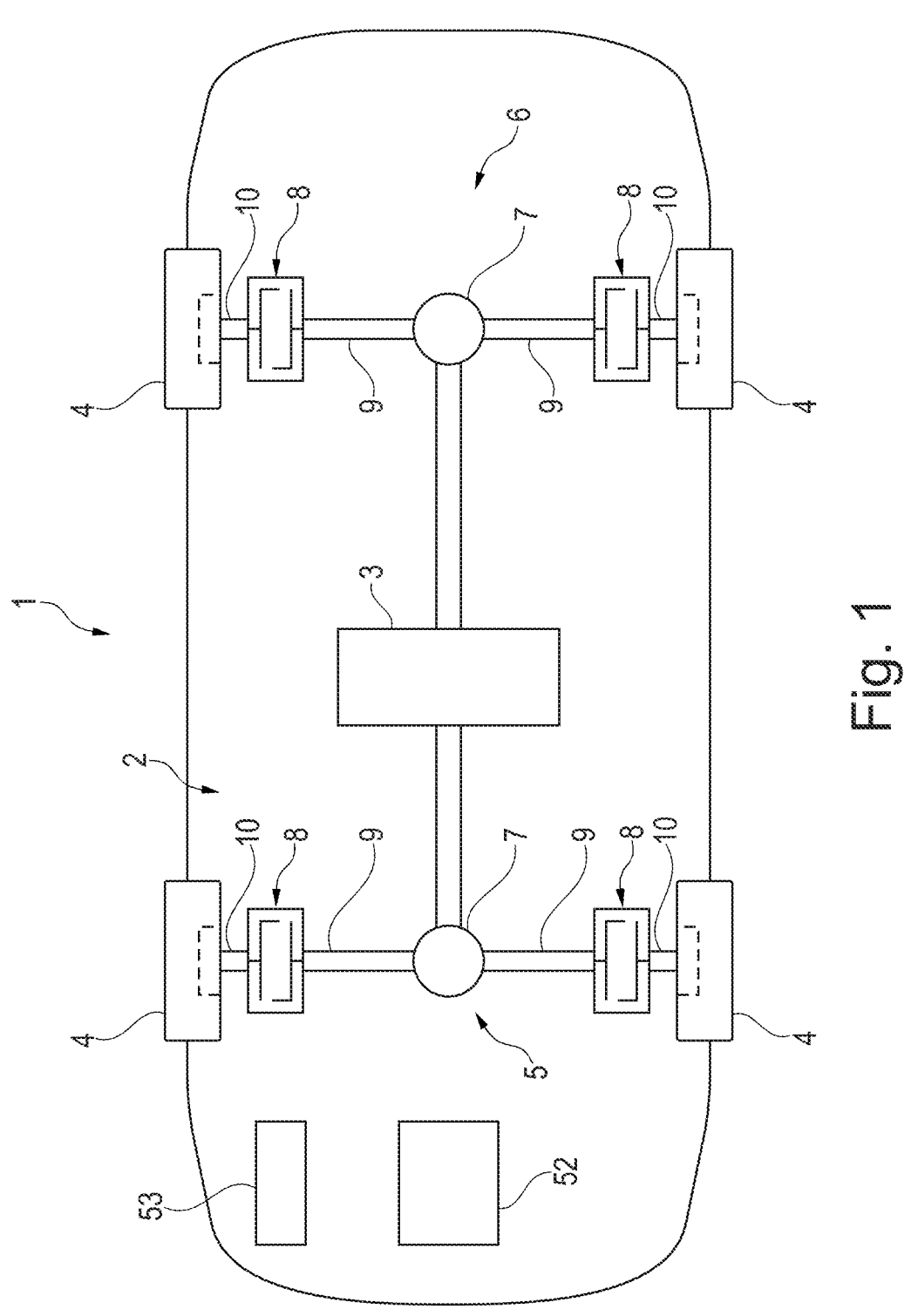
FIG. 1 shows a motor vehicle with an exemplary embodiment of a drive train according to the disclosure including four coupling devices according to the disclosure.

FIG. 1 shows a motor vehicle 1 with a drive train 2, by means of which a torque can be transmitted from an engine configured as an electric machine 3 to the wheels 4 of the motor vehicle 1 and vice versa. In this case the motor vehicle 1 is an electric vehicle. It is equally conceivable that, in addition to or as an alternative to the electric machine 3, an internal combustion engine is provided as an engine.

The motor vehicle 1 is an all-wheel drive vehicle, for example, wherein the front axle 5 and the rear axle 6 each have a differential transmission 7 for selective transmission of the torque to the wheels 4. The drive train 2 also includes four coupling devices 8, each provided for coupling and decoupling a drive element 9 to and from an output element 10 of the drive train 2. The drive element 9 is a drive shaft arranged in each case between the differential transmission 7 and the coupling device 8. The output element 10 is a shaft directly connected to a wheel hub of the wheel 4. Although the coupling device 8 can in principle be arranged at any desired location in the drive train 2, in the present exemplary embodiment the wheels 4 can each be coupled and decoupled from the rest of the drive train 2 by means of one of the coupling devices 8.

Figure 2:
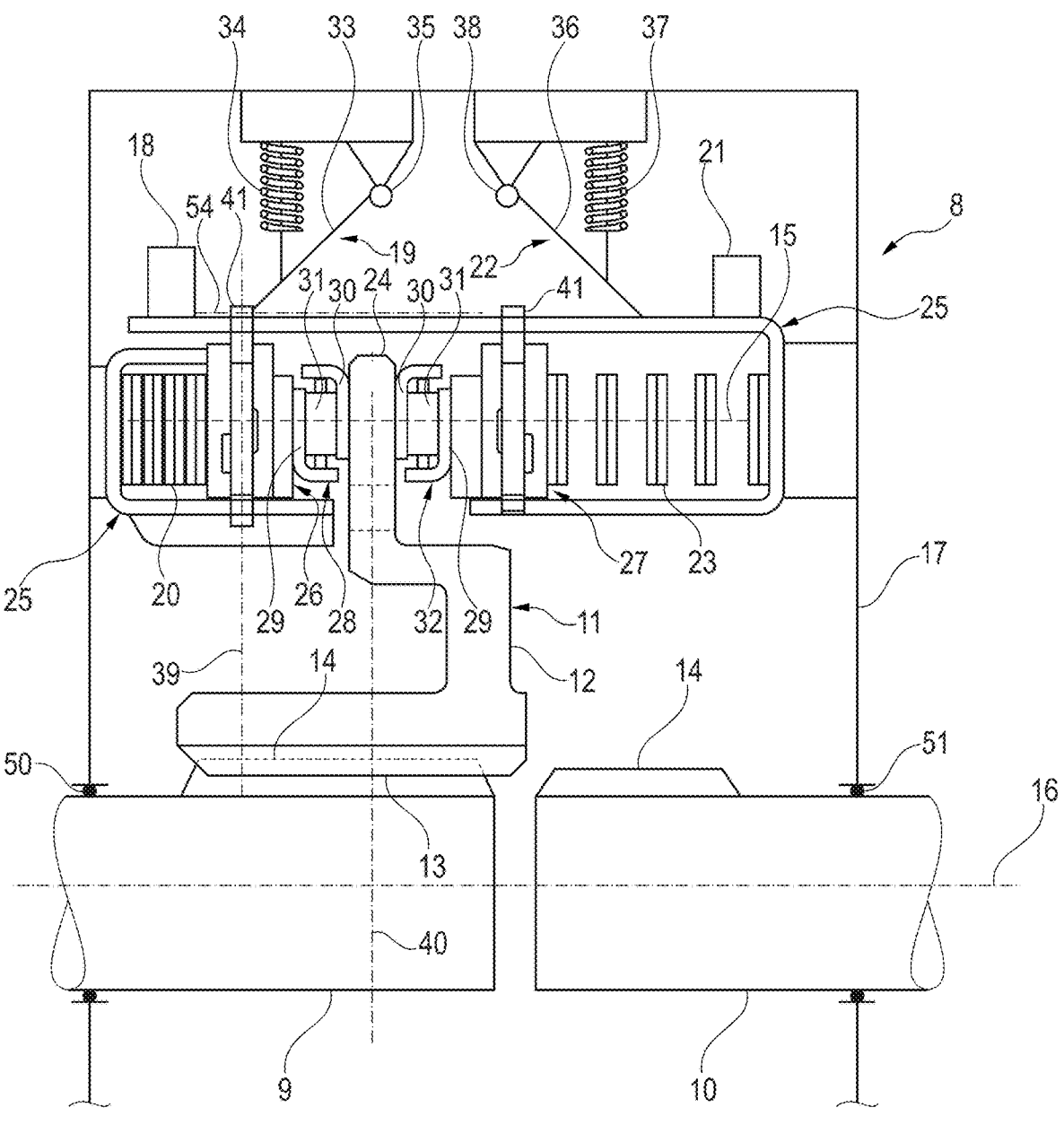
FIG. 2 shows one of the coupling devices of the drive train of the motor vehicle from FIG. 1.

Further details regarding the uniform coupling devices 8 are explained below with reference to FIG. 2, which shows a longitudinal section through one of the coupling devices 8. The coupling device 8 includes a coupling element 11, which in the present case is a shift collar 12. The coupling element 11 or the shift collar 12 can be transferred from a coupling position, in which it couples the drive element 9 to the output element 10, into a decoupling position, in which the drive element 9 is decoupled from the output element 10. The shift collar 12 is annular and has an internal toothing 13 arranged on its inner circumference. The drive element 9 and the output element 10 each have an external toothing 14 on their outer circumference. The coupling element 11 or the shift collar 12 is linearly displaceable along a movement route 15, which is indicated in FIG. 2 by a dashed line. In the position shown in FIG. 2, the coupling element 11 or the internal toothing 13 of the shift collar 12 is only in engagement with the external toothing 14 of the drive element 9, such that the elements 9, 10 are not rotationally coupled to one another and the coupling element 11 is therefore in the decoupling position. Displacement of the coupling element 11 along the movement route 15, to the right in FIG. 2, causes the internal toothing 13 of the shift collar 12 to engage with the external toothing 14 of the drive element 9 and at the same time with the external toothing 14 of the output element 10. The resulting interlocking connection brings about rotational coupling of the elements 9, 10, such that the coupling element 11 is in the coupling position in this position.

As already mentioned, the shift collar 12 is annular, wherein the axes of rotation 16 of the elements 9, 10 or of these shafts and the central axis running in the axial direction of the shift collar 12 coincide. FIG. 2 shows only one half of the coupling device 8, and, due to the stated symmetry about the axis 16, the other part of the coupling device 8 is accordingly configured in the same way.

The coupling device 8 is delimited on the outside by a cylindrical housing 17, which is arranged coaxially with respect to the elements 9, 10. The elements 9, 10 each run into and back out of the housing 17, and sealing elements 50, 51 are provided for sealing the drive element 9 and the output element 10 with respect to a lubricant provided within the housing 17. By way of example, the sealing element 50 is a dynamic seal, e.g., a radial shaft sealing ring, and the sealing element 51 is a static seal, e.g., an O-ring.

In the following, first of all details regarding transfer of the coupling element 11 from the decoupling position shown in FIG. 2 as the starting position into the coupling position are explained with reference to said figure. The coupling device 8 includes a first actuator 18, shown highly schematically in FIG. 2, a first latching device 19 and a first spring element 20. The first spring element 20 is a coil spring which extends along a radially outer portion or a radial, flange-like outer portion of the shift collar 12. It is also conceivable for the first spring element 20 to include a plurality of coil springs which are arranged next to one another along the radially outer portion of the shift collar 12, or for the first spring element 20 to be a disk spring extending along the radially outer portion of the shift collar 12.

The components 18, 19, 20 serve to transfer the coupling element 11 from the decoupling position into the coupling position. Analogously, the coupling device further includes a second actuator 21, a second latching device 22 and a second spring element 23, which are identical with respect to the components 18, 19, 20 and are merely mirror-inverted. The components 21, 22, 23 serve to transfer the coupling element from the coupling position into the decoupling position. The specific mode of operation of components 18 to 23 is explained further below. The aspects set out in connection with components 18 to 20 fundamentally apply equally to elements 21 to 23.

First, the mechanical structure of the coupling device 8 will be explained. The spring element 20 is arranged between the coupling element 11, in this case between the radial, flange-like outer portion 24 of the shift collar 12, and a component 25 which is stationary with respect to the housing 17, and is supported on said component. The stationary component 25 is a hollow-cylindrical inner housing of the coupling device 8 which is fastened to the housing 17 and encloses the spring elements 20, 23. The first spring element 20, and likewise the second spring element 23, are supported directly on an inner wall of the stationary component 25 or on the inner housing. At their other ends, the spring elements 20, 23 are supported indirectly on the coupling element 11 in the region of the outer portion 24 of the shift collar 12. "Indirectly" here means that there is no physical contact between the respective spring element 20, 23 and the coupling element 11, but that additional components are arranged therebetween.

For instance, the spring element 20 is supported on a disk-like first guide element 26, which moves along with the coupling element 11 when the coupling element is displaced along the movement route 15. Similarly, the second spring element 23 is supported on a disk-like second guide element 27. The guide elements 26, 27 are arranged within the stationary component 25 provided as the inner housing and are mounted there so as to be longitudinally movable.

A first bearing 28 provided as an axial needle bearing is provided between the first guide element 26 and the coupling element 11 or the outer portion 24 of the shift collar 12, and the coupling element 11 is connected to the rotationally fixed first guide element 26 by means of the first bearing 28. The first bearing 28 includes a rotationally fixed bearing surface 29 on which the first spring element 20 is supported via the first guide element 26. Furthermore, the first bearing 28 includes an annular, rotatable bearing surface 30 which is fastened to the outer portion 24 of the shift collar 12. Bearing rollers 31 of the first bearing 28 are arranged between the bearing surfaces 29, 30. Similarly, a second bearing 32, also configured as an axial needle bearing, is arranged between the second spring element 23 or the second guide element 27 and the coupling element 11. The two rotatable bearing surfaces 30 are formed on or fastened to the opposite end faces of the outer portion 24.

The components of the first latching device 19 are explained below with reference to the highly schematic FIG. 2. The first latching device 19 includes a first latching pawl 33, a first return spring 34 coupled to the first latching pawl 33 and a first pawl actuator 35. Similarly, the second latching device 22 has a second latching pawl 36, a second return spring 37 coupled to the second latching pawl 36 and a second pawl actuator 38. The functionality and purpose of the latching devices 19, 22 is explained below.

In the following, transfer of the coupling element 11 from the coupling position into the decoupling position and then transfer from the decoupling position into the coupling position is explained with reference to FIG. 2, with additional reference to FIGS. 3 and 4. By way of example, in the exemplary embodiment shown, the actuators 18, 21, the latching devices 19, 22, the spring elements 20, 23 as well as the guide elements 26, 27 and the bearings 28, 32 are each configured to be mirror-symmetrical with respect to the outer portion 24. The spring elements 20, 23, for example, have the same spring stiffness.

Figure 3:
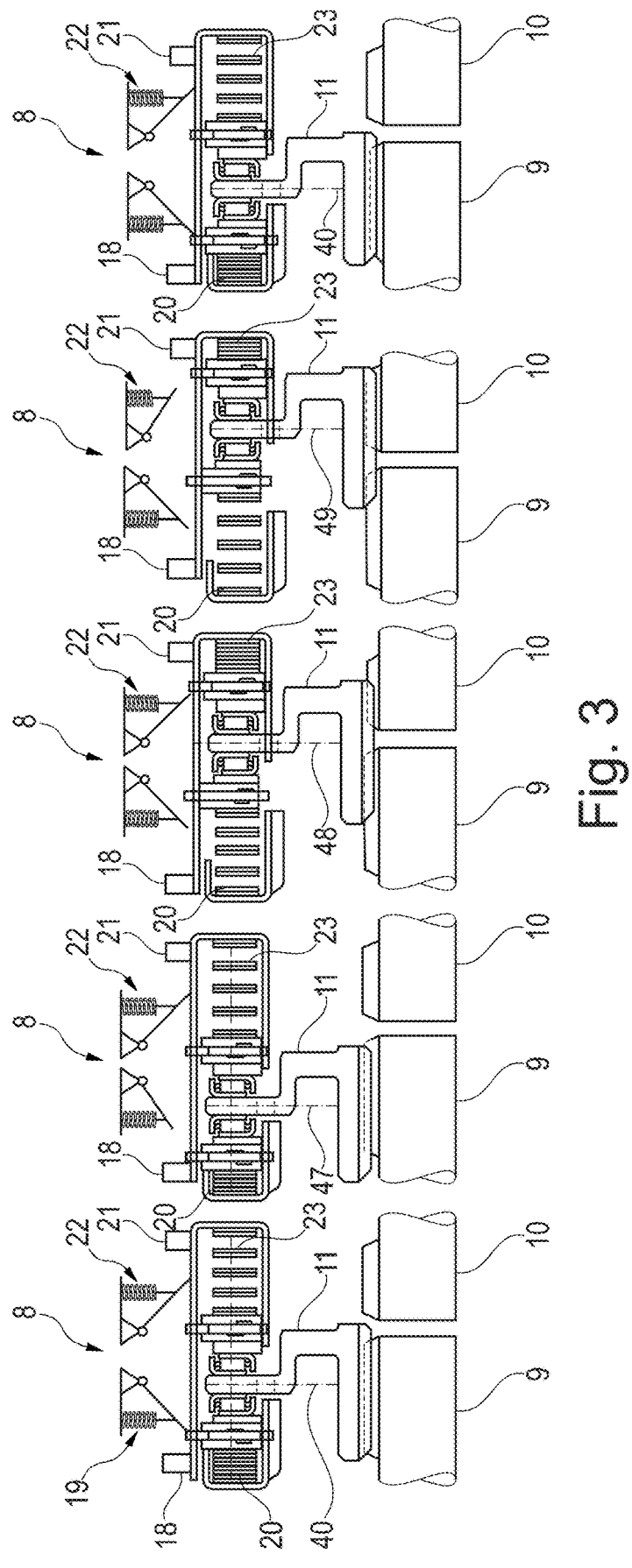
FIG. 3 shows a sequence of several individual representations of the coupling device from FIG. 2 to explain transfer of the coupling element from the decoupling position into the coupling position and vice versa.

The five subfigures shown in FIG. 3 each show the coupling device 8 from FIG. 2. The first subfigure, as viewed from the left, corresponds to the state shown in FIG. 2, i.e., the state in which the coupling element 11 is in the decoupling position. In this position, the coupling element 11 is fixed by means of the first latching device 19 and the first spring element 20 is compressed, such that its elastic restoring force forces the coupling element 11 along the movement route 15 in the direction of the coupling position. The coupling element 11 is fixed in this position by means of a projection 41 of the first guide element 26. The projection 41 protrudes through a longitudinal opening in the inner housing and moves along a movement path 54 when the shift collar 12 is displaced in the axial direction. In this state, the first latching pawl 33 is in a latching position in which it protrudes into the movement path 54 of the projection 41. The projection 41 here rests on the first latching pawl 33 against the elastic restoring force of the first spring element 20. The first return spring 34 presses the first latching pawl 33, with respect to FIG. 2, downwards into the movement path 54 of the projection 41.

Figure 4:
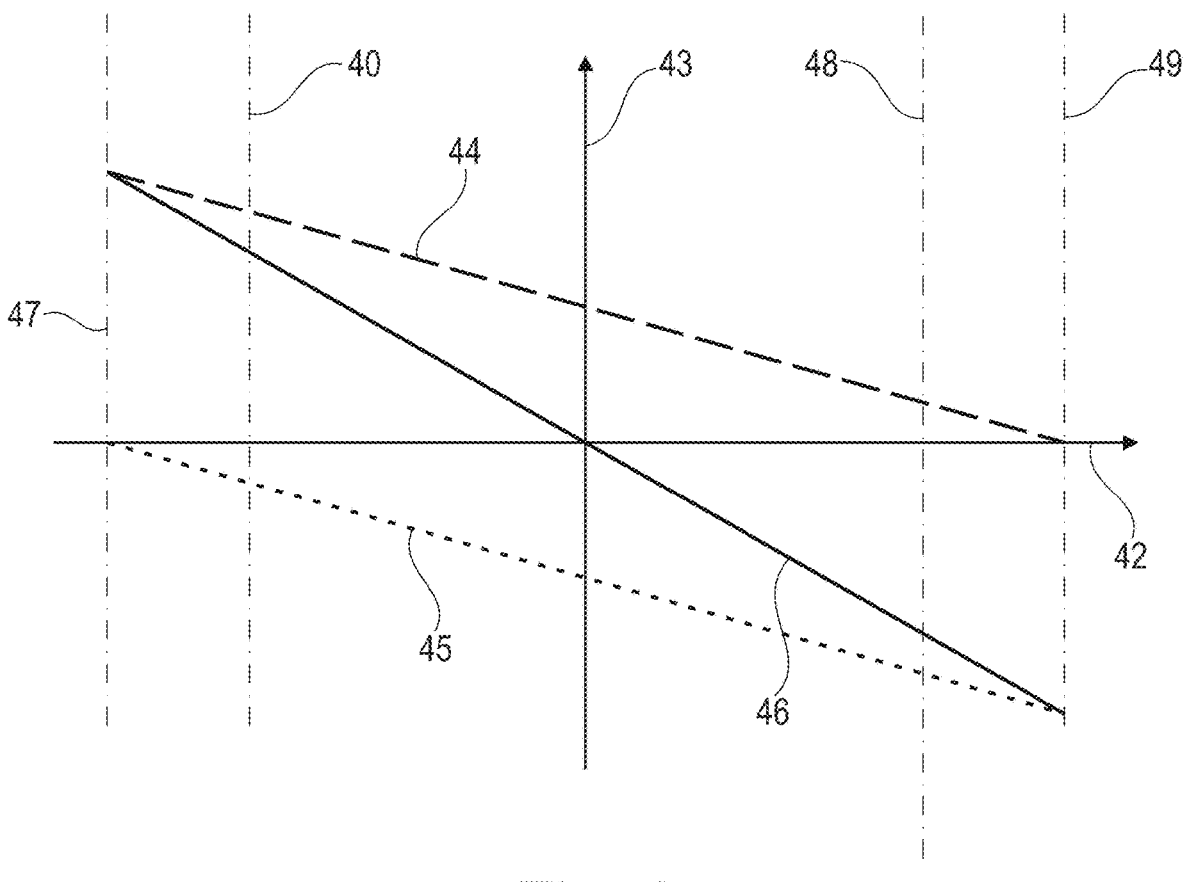
FIG. 4 shows a diagram to illustrate the elastic restoring forces of the spring elements of the coupling device from FIGS. 2 and 3.

FIG. 4 shows a coordinate system, the abscissa 42 of which shows the position of the coupling element 11 or the associated outer portion 24, in relation to the movement route 15. For better understanding, the line 40 relating to the position of the coupling element 11 shown in FIG. 2 is also shown in FIGS. 2, 3 and 4. The ordinate 43 of the coordinate system shown in FIG. 4 relates to the elastic restoring force brought about by the spring elements 20, 23. The dashed line 44 shows the elastic restoring force brought about by the first spring element 20 and the dotted line 45 shows the elastic restoring force brought about by the second spring element 23. The line 46 shows the sum of the two lines 44, 45, i.e., the total force acting overall on the coupling element 11 and brought about by the spring elements 20, 23.

In order to transfer the coupling element 11 from the decoupling state into the coupling state, the first spring element 20 is further loaded by means of the first actuator 18, which moves the first guide element 26 together with the coupling element 11 to the left until the state of the coupling device 8 shown in the second subfigure from the left in FIG. 3 is reached. The projection 41 is located at the extreme end position with respect to the movement path 54. Likewise, the coupling element is located at the extreme end position with respect to the movement route 15, said extreme end position being indicated by the line 47 in FIGS. 3 and 4. By way of example, the second spring element 23 is in the relaxed state, such that the total force acting on the coupling element 11 is caused solely by the first spring element 20.

During the further loading of the first spring element 20 as just described, the fixing of the coupling element 11 by means of the first latching device 19 is canceled. This takes place in that the first latching pawl 33 is transferred by means of the first pawl actuator 35 into a release position in which the movement path 54 is released or the first latching pawl 33 no longer comes into contact with the projection 41 if the latter passes the corresponding point on the movement path 54. The corresponding movement of the first latching pawl 33 occurs against the elastic restoring force of the first return spring 34.

Subsequently, the coupling element 11 is released by the first actuator 18 such that the first spring element 20 relaxes. In the process, the coupling element 11 is moved to the right along the movement route 15, the second spring element 23 being loaded accordingly. The projection 41 of the first guide element 26 passes the first latching pawl 33, which is in the release position. The projection 41 of the second guide element 27, on the other hand, runs from below against the second latching pawl 36 extending obliquely with respect to the corresponding direction of movement, such that the second spring element 37 is moved upwards against its elastic restoring force until the projection 41 of the second guide element 27 has passed the corresponding position. After this passage, the second spring element 37 forces the second latching pawl 36 back into the movement path of the projection 41 of the second guide element 27 and thus into the latching position. The movement of the coupling element 11 to the right is reversed due to the increasing elastic restoring force of the second spring element 23 after a corresponding dead center has been passed, such that the projection 41 of the second guide element 27 then runs from the right, with respect to the figures, against the second latching pawl 36, thereby ultimately fixing the coupling element in the coupling position. This state is shown in the middle subfigure of FIG. 3, in which the coupling element 11 is in the position indicated by the line 48. In this position, the internal toothing 13 of the coupling element 11 engages interlockingly in both external toothings 14 of the drive element 9 and the output element 10, such that a torque present on the drive element 9 is transmitted to the output element 10 and vice versa. The elements 9, 10 and the shift collar 12 rotate together in this state.

To return the coupling element 11 to the decoupling position, the steps just explained are repeated analogously, only in the opposite direction. Thus, firstly, the coupling element 11 is moved to the right by means of the second actuator 21, such that the second spring element 23 is further loaded, wherein the second pawl actuator 38 transfers the second latching pawl 36 into the release position against the elastic restoring force of the second return spring 37. This state is shown in the fourth subfigure from the left in FIG. 3. The associated position of the coupling element 11 is indicated by the line 49. Subsequently, the coupling element 11 is released by the second actuator 21, such that it moves back into the decoupling position, so causing the second spring element 23 to relax and loading the first spring element 20, the coupling element 11 being fixed again by means of the first latching device 19 in the decoupling position. This state is shown in the right-hand subfigure of FIG. 3, which ultimately corresponds to the left-hand subfigure of FIG. 3. The coupling element 11 is here again in the position indicated by the line 40.

The functional concept just explained can be described as bistable. If there is a failure in the decoupling or coupling state of the coupling element 11, for example a failure of the electrical power supply by means of which the actuators 18, 21 or the pawl actuators 35, 38 are operated, then, due to the latching device 19, 22 being in the respective state, the coupling device 8 remains in the corresponding state. If such a failure occurs during transfer of the latching element 11 into the coupling or decoupling position, the latching element 11 remains in the respective starting position if the failure occurs before the projection 41 has passed the latching device 19, 22 which is to be passed and which is in the release position. This is because, due to the restoring force of the return springs 34, 37, the respective latching pawl 33, 36 is automatically forced into the latching position when the force which is generated by the pawl actuator 35, 38 and which holds the latching pawl 33, 36 in the release position is removed. Accordingly, the latching element 11 switches to the respective other position if the failure occurs after the projection 41 has passed the latching device 19, 22 which is to be passed and which is in the release position.

With reference again to FIG. 1, a control device 52 is provided which is connected to the actuators 18, 21 and the pawl actuators 35, 38. The control device 52 is configured to drive the actuators 18, 21 and the pawl actuators 35, 38 in such a way that transfer of the coupling element 11 as just explained takes place when a control signal is present which indicates a transfer of the coupling element 11 from the starting position into the respective other position. The control signal indicating transfer of the coupling element 11 can be present at a vehicle controller 53 and is transmitted to the control device 52.

REFERENCE NUMERALS

1 Motor vehicle
2 Drive train

3 Electric machine
4 Wheels
5 Front axle
6 Rear axle
7 Differential transmission
8 Coupling devices
9 Drive element
10 Output element
11 Coupling element
12 Shift collar
13 Internal toothing
14 External toothing
15 Movement route
16 Axes of rotation
17 Housing
18 Actuator
19 Latching device
20 Spring element
21 Actuator
22 Latching device
23 Spring element
24 Outer portion
25 Component
26 Guide element
27 Guide element
28 Bearing
29 Bearing surface
30 Bearing surface
31 Bearing rollers
32 Bearing
33 First latching pawl
34 First return spring
35 First pawl actuator
36 Second latching pawl
37 Second return spring
38 Second pawl actuator
39 Line
40 Line
41 Projection
42 Abscissa
43 Coordinate
44 Line
45 Line
46 Line
47 Line
48 Line
49 Line
50 Sealing element
51 Sealing element
52 Control device
53 Vehicle controller
54 Movement path

The invention claimed is:

1. A coupling device for coupling and decoupling a drive element with an output element of a drive train for a motor vehicle, comprising a coupling element which can be transferred from a coupling position, in which it couples the drive element with the output element, into a decoupling position, in which the drive element is decoupled from the output element, and vice versa, wherein at least one actuator, at least one latching device and at least one spring element are provided, wherein the coupling element is fixed in the coupling or decoupling position as a starting position by means of the latching device while the spring element is simultaneously under load and loads the coupling element into the respective other position, and wherein the spring element can be further loaded by means of the actuator for transfer into the respective other position and the fixing by the latching device can be canceled such that the coupling element can be linearly displaced into the other position by means of the spring element after release by the actuator, wherein the spring element is arranged between the coupling element and a component that is stationary with respect to a housing of the coupling device, or an inner housing arranged in the housing, and is supported thereon.

2. The coupling device according to claim 1, wherein one actuator, one spring element and one latching device are provided in each case for movement from the decoupling position into the coupling position and from the coupling position into the decoupling position.

3. The coupling device according to claim 1, wherein the spring element is or comprises a coil spring or a disk spring.

4. The coupling device according to claim 1, wherein the coupling element comprises a shift collar rotatably mounted by means of a bearing, wherein the shift collar has an internal toothing which is arranged on an inner circumference and which can be brought into engagement with an external toothing arranged on an outer circumference of the drive element and at the same time with an external toothing arranged on an outer circumference of the output element in order to couple the drive element to the output element.

5. The coupling device according to claim 1, wherein a bearing by means of which the coupling element is rotatably mounted is an axial needle bearing, comprising an annular, rotationally fixed bearing surface with respect to the housing of the coupling device, on which bearing surface the spring element is supported, and an annular, rotatable bearing surface which is fastened to a shift collar of the coupling element, or is formed thereon, wherein at least one bearing roller of the axial needle bearing is arranged between the rotationally fixed bearing surface and the rotatable bearing surface.

6. The coupling device according to claim 1, wherein the latching device comprises a latching pawl which can be moved from a latching position into a release position, wherein, in the latching position, the latching pawl protrudes into a movement route along which the coupling element moves on transfer from the starting position into the respective other position, or into a movement path along which a guide element moving with the coupling element moves on transfer from the starting position into the respective other position, and in the release position releases the movement route.

7. The coupling device according to claim 6, wherein the latching device has a return spring coupled to the latching pawl and a pawl actuator, wherein the latching pawl can be transferred from the release position into the latching position or vice versa by means of the pawl actuator and against an elastic restoring force of the return spring, wherein the latching pawl can be transferred into the respective other position by means of the elastic restoring force.

8. The coupling device according to claim 1, wherein a control device of the coupling device or of the motor vehicle is connected to the actuator and the latching device, wherein the control device is configured, when a control signal is present which indicates transfer of the coupling element from the starting position into the respective other position, to drive the actuator and the latching device in such a way that the spring element is further loaded by means of the actuator and fixing by the latching device is canceled.

9. A drive train for a motor vehicle, comprising the drive element, the output element and the coupling device according to claim 1 for coupling and decoupling the drive element to and from the output element.

10. A coupling device for coupling and decoupling a drive element with an output element of a drive train for a motor vehicle, comprising:

a coupling element, linearly displaceable from a coupling position to a decoupling position;

a first latching device for fixing the coupling element in a one of the coupling position or the decoupling position;

a first spring element for urging the coupling element into the other one of the coupling position or the decoupling position;

a first actuator arranged to cancel the fixing of the first latching device and to further load the first spring element to displace the coupling element into the other one of the coupling position or the decoupling position; and a housing, the first spring element being arranged between:

the coupling element and the housing; or the coupling element and an inner housing arranged in and supported on the housing, wherein:

in the coupling position, the coupling element couples the drive element with the output element; and in the decoupling position, the drive element is decoupled from the output element.

11. The coupling device of claim 10 further comprising:

a second latching device for fixing the coupling element in the decoupling position;

a second spring element for urging the coupling element into the coupling position; and a second actuator arranged to cancel the fixing of the second latching device and to further load the second spring element to displace the coupling element into the coupling position, wherein the one of the coupling position or the decoupling position is the coupling position.

12. The coupling device of claim 10, wherein the first spring element comprises a coil spring or a disk spring.

13. The coupling device of claim 10, further comprising a bearing, wherein:

the coupling element comprises a shift collar rotatably mounted by the bearing; and the shift collar comprises an internal toothing arranged on an inner circumference and engageable with an external toothing arranged on an outer circumference of the drive element and an external toothing arranged on an outer circumference of the output element to couple the drive element to the output element.

14. The coupling device of claim 10 further comprising:

a housing; and an axial needle bearing, the axial needle bearing comprising:

an annular, rotationally fixed bearing surface arranged on the housing and supporting the first spring element;

an annular, rotatable bearing surface fastened to the coupling element or formed thereon; and a bearing roller arranged between the rotationally fixed bearing surface and the rotatable bearing surface.

15. The coupling device of claim 10 wherein:

the first latching device comprises a latching pawl, movable between a latching position and a release position;

in the latching position, the latching pawl protrudes into a path traveled by the coupling element during a transition from the one of the coupling position or the decoupling position to the other one of the coupling position or the decoupling position; and in the release position, the latching pawl is removed from the path.

16. The coupling device of claim 15, wherein:

the first latching device comprises:

a return spring coupled to the latching pawl for providing an elastic restoring force for moving the latching pawl to a one of the latching position or the release position; and a pawl actuator for moving the latching pawl against the elastic restoring force to the other one of the latching position or the release position.

17. A coupling device for coupling and decoupling a drive element with an output element of a drive train for a motor vehicle, comprising:

a coupling element, linearly displaceable from a coupling position to a decoupling position;

a first latching device for fixing the coupling element in a one of the coupling position or the decoupling position;

a first spring element for urging the coupling element into the other one of the coupling position or the decoupling position;

a first actuator arranged to cancel the fixing of the first latching device and to further load the first spring element to displace the coupling element into the other one of the coupling position or the decoupling position;

a housing; and an axial needle bearing, the axial needle bearing comprising:

an annular, rotationally fixed bearing surface arranged on the housing and supporting the first spring element;

an annular, rotatable bearing surface fastened to the coupling element or formed thereon; and a bearing roller arranged between the rotationally fixed bearing surface and the rotatable bearing surface, wherein:

in the coupling position, the coupling element couples the drive element with the output element; and in the decoupling position, the drive element is decoupled from the output element.

* * * * *